UNITED STATES PATENT OFFICE.

LOREN G. POLHAMUS, OF CHULA VISTA, CALIFORNIA, DEDICATED BY MESNE ASSIGNMENTS TO THE PEOPLE OF THE UNITED STATES.

METHOD OF DELINTING COTTON SEED.

1,425,688.     Specification of Letters Patent.     Patented Aug. 15, 1922.

No Drawing.     Application filed April 19, 1922. Serial No. 555,636.

(FILED UNDER THE ACT OF MARCH 3, 1883, 22 STAT. L., 625.)

*To all whom it may concern:*

Be it known that I, LOREN G. POLHAMUS, a citizen of the United States of America, and an employee of the Department of Agriculture of the United States of America, residing at Chula Vista, California, have invented a new and useful Method of Delinting Cotton Seed, of which the following is a specification.

This application is made under the act of March 3, 1883, chapter 143 (22 Stat., 625) and the invention herein described and claimed may be used by the Government of the United States, its officers and employees, and by any person in the United States either in public or private work without payment to me of any royalty thereon. I hereby dedicate the same to the free use of the Government and the people of the United States.

In practising my invention, ginned cotton seed is exposed for a period of from ten minutes to two hours to the fumes of hydrochloric acid, which is generated by the action of sulfuric acid on sodium chloride, the most effective time of exposure under ordinary conditions being from 40 minutes to one hour. This renders the fuzz or lint extremely brittle. The fumes of hydrochloric acid are passed into suitable containers, protected from the corrosive action of the gas, the concentration of the hydrochloric acid, which may be generated by the action of sulfuric acid on sodium chloride, being regulated in the treating chamber by valves or other mechanical devices, and the humidity and temperature of the heating chamber being also controlled by the use of steam pipes whenever this appears to be necessary.

After removal from the treating chamber, the cotton seed is agitated upon a revolving drum or similar apparatus for the purpose of removing the fuzz or lint from the cotton seed.

To further protect the viability of the seed when it is to be stored for long periods it is placed in a wood or metal treating chamber and exposed for a short period to the fumes of ammonia gas, the concentration of the ammonia gas and the humidity of the treating chamber being under control by valves or other mechanical devices.

I claim:

The method of delinting cotton seed consisting in exposing cotton seed to the action of gaseous hydrochloric acid for approximately one hour to render the lint extremely brittle, in then agitating the cotton seed to remove the lint, and subsequently, in exposing the cotton seed to fumes of ammonia gas to protect the viability of the seed.

LOREN G. POLHAMUS.